United States Patent
Hucker

(10) Patent No.: US 10,626,653 B2
(45) Date of Patent: Apr. 21, 2020

(54) METHOD FOR THE COMMISSIONING OF A DOOR OR WINDOW CLOSER

(71) Applicant: GEZE GmbH, Leonberg (DE)

(72) Inventor: Matthias Hucker, Marxzell (DE)

(73) Assignee: Geze GmbH, Leonberg (DE)

( * ) Notice: Subject to any disclaimer, the term of this patent is extended or adjusted under 35 U.S.C. 154(b) by 0 days.

(21) Appl. No.: 15/890,103

(22) Filed: Feb. 6, 2018

(65) Prior Publication Data

US 2018/0223577 A1 Aug. 9, 2018

(30) Foreign Application Priority Data

Feb. 8, 2017 (DE) .................. 10 2017 201 951

(51) Int. Cl.
*E05F 5/00* (2017.01)
*E05F 1/10* (2006.01)
(Continued)

(52) U.S. Cl.
CPC .................. *E05F 3/00* (2013.01); *E05F 1/10* (2013.01); *E05F 15/63* (2015.01); *E05F 15/73* (2015.01); *G05B 13/02* (2013.01); *G05B 13/0265* (2013.01); *E05F 2015/631* (2015.01); *E05Y 2201/21* (2013.01); *E05Y 2201/23* (2013.01);
(Continued)

(58) Field of Classification Search
CPC ....... E05F 15/63; E05F 1/10; E05F 2015/631; E05F 3/00; E05F 15/608; E05F 3/224; E05F 2201/412; E05Y 2201/21; E05Y 2201/408; E05Y 2201/434; E05Y 2201/47; E05Y 2400/302; E05Y 2400/31; E05Y 2400/315; E05Y 2400/36; E05Y 2400/44; E05Y 2400/80; E05Y 2900/132; E05Y 2201/424; E05Y 2201/426; E05Y 2400/614; G05B 13/02

See application file for complete search history.

(56) References Cited

U.S. PATENT DOCUMENTS

2009/0093913 A1* 4/2009 Copeland, II ............. E05F 3/12
700/282
2011/0257797 A1* 10/2011 Burris ..................... E05F 3/102
700/282

(Continued)

FOREIGN PATENT DOCUMENTS

DE      10301016 A1    7/2004
DE   102011055491 A1    5/2013
(Continued)

*Primary Examiner* — Dionne Pendleton
(74) *Attorney, Agent, or Firm* — Steven M. Shape; Dennemeyer & Associates, LLC

(57) ABSTRACT

In a method for the commissioning of a door or window closer which comprises an energy accumulator, a damping device with an electric motor being operable as a generator and a transmission element, the leaf is opened and/or closed at least once in a teach-in process, the angular position of the motor shaft is detected during opening and/or closing, a functional relationship is determined between the angular position of the motor shaft and an angular position of the rotatable leaf at least over an area of the opening width of the leaf and the functional connection is automatically taken as a basis for a subsequent actuation of the electric motor for the damping of the closing movement of the leaf.

20 Claims, 5 Drawing Sheets

(51) Int. Cl.
*G05B 13/02* (2006.01)
*G05B 11/01* (2006.01)
*G05B 15/02* (2006.01)
*E05F 3/00* (2006.01)
*E05F 15/63* (2015.01)
*E05F 15/73* (2015.01)

(52) U.S. Cl.
CPC ..... *E05Y 2201/408* (2013.01); *E05Y 2201/41* (2013.01); *E05Y 2201/422* (2013.01); *E05Y 2201/434* (2013.01); *E05Y 2201/47* (2013.01); *E05Y 2400/302* (2013.01); *E05Y 2400/31* (2013.01); *E05Y 2400/315* (2013.01); *E05Y 2400/36* (2013.01); *E05Y 2400/44* (2013.01); *E05Y 2400/80* (2013.01); *E05Y 2900/132* (2013.01)

(56) References Cited

U.S. PATENT DOCUMENTS

2013/0340343 A1* 12/2013 Dye ............... E05F 15/614
  49/70
2014/0346997 A1* 11/2014 Salutzki ............... E05F 3/224
  318/628
2018/0371818 A1* 12/2018 Ladha .................. E05F 3/22

FOREIGN PATENT DOCUMENTS

| | | |
|---|---|---|
| DE | 102014201399 A1 | 7/2015 |
| DE | 102015200284 B3 | 10/2015 |
| EP | 0548505 A1 | 6/1993 |
| EP | 1437476 A2 | 7/2004 |
| EP | 1870552 A2 | 12/2007 |
| EP | 2290808 A1 | 3/2011 |

* cited by examiner

METHOD FOR THE COMMISSIONING OF A DOOR OR WINDOW CLOSER

CROSS-REFERENCE TO RELATED APPLICATIONS

This application claims priority to German application 102017201951.4, filed Feb. 8, 2017, which is hereby incorporated by reference in its entirety.

The present invention relates to a method for the commissioning of a door or window closer which comprises an energy accumulator for supplying a closing force for closing a rotatable door leaf or window sash and a damping device counteracting the closing force with an electric motor being operable as a generator, wherein a motor shaft of the electric motor is coupled to the leaf by at least one transmission element and is therefore rotatable by a movement of the leaf.

Door and window closers serve to reclose a manually opened leaf in a power-operated manner after said leaf has been released. The closing force can, for example, be applied by a closing spring which is tensioned through the manual opening of the leaf. The damping device serves to prevent an excessively rapid closing process. The motor terminals of the electric motor can be short-circuited for the purpose of damping by means of one or a plurality of switching elements. For controlling or regulating the damping, an electronic control device can alternately short-circuit and disconnect the motor terminals, thus effecting a pulse width modulation of the motor current. Such a damping control device is described in DE 10 2015 200 284 B3.

There are different designs of door and window closers. Moreover, a door closer can be installed by different methods. For example, top mounting or a door leaf mounting may be used depending on the application specification. Furthermore, a door closer can optionally be fitted either on the hinge side or on the side opposite the hinge. In addition, the force transmission between the leaf and window frame can take place by means of a sliding arm or by means of a projecting arm. Moreover, a distinction is to be made between the mounting method for a left-rotating leaf and the mounting method for a right-rotating leaf.

The dependence of the leaf position on the motor shaft position or the position of a closer shaft, also termed transmission, generally differs in individual designs and mounting methods. However, for an exact, reliable control of the damping device, the actual dependence must be known so that it can be considered. In order to establish the correct mounting parameters and hence the transmission, a technician can enter them via an interface when installing the closer. However, this is time-consuming and cumbersome. Moreover, it can easily result in misentries.

An objective of the invention is to simplify the commissioning of door or window closers of the mentioned type.

The solution of the objective is achieved by a method with the features of claim 1.

According to the invention, the leaf is opened and/or closed at least once in a teach-in process, the angular position of the motor shaft is recorded during the opening and/or closing, a functional relationship is determined between the angular position of the motor shaft and an angular position of the rotatable leaf at least over an area of the opening width of the leaf on the basis of the detected angular position of the motor shaft and the functional relationship is automatically taken as a basis for a subsequent actuation of the electric motor for the damping of the closing movement of the leaf. Thus, a theoretical dependence of the leaf position on the motor shaft position is not determined but rather the actual dependence of the leaf position on the motor shaft position is learned. This is not only simpler and faster than an input via an interface, undesirable misentries are also avoided. Because the functional relationship between the motor shaft position and the leaf position is automatically determined and is established for the subsequent operation of the door closer, there are no complicated and erroneous manual inputs during installation. The technician must instead only perform a single leaf opening or leaf closing and confirm the learning process where applicable.

The invention relies specifically on the knowledge that all the essential mounting parameters should be derived from the rotary position of the motor shaft as a function of the leaf position and that the mentioned dependence can be determined in a relatively simple manner by monitoring the motor shaft position during a single opening or closing process. The angular position of the motor shaft can be recorded continuously or intermittently throughout the entire opening angle range of the leaf although this is not compulsory. Commissioning according to the invention enables a particularly exact, reliable control of the damping device of a door or window closer, irrespective of the assembly type, the transmission and/or the play in the transmission path.

Developments of the invention are specified in the dependent claims, the description and in the attached drawings.

Preferably the mass moment of inertia of the leaf is also determined on the basis of the recorded angular position of the motor shaft and is automatically taken as a basis for a subsequent actuation of the electric motor for damping the closing movement of the leaf. For exact control of the damping device on the basis of a movement model, knowledge of the actual mass moment of inertia of the leaf is required. For a technician on a construction site, however, it is difficult or even impossible to determine the mass moment of inertia of the leaf with sufficient accuracy. It is therefore highly advantageous for the actual mass moment of inertia of the leaf to be determined and established automatically as part of the commissioning.

One embodiment of the invention provides that the energy accumulator comprises a closing spring wherein pre-tensioning of the closing spring is also determined on the basis of the recorded angular position of the motor shaft and is automatically taken as a basis for a subsequent actuation of the electric motor for damping the closing movement of the leaf. The pre-tensioning of the spring has an influence on the closing behaviour of the leaf and should therefore be taken into consideration when controlling the damping device. It is however frequently manually adjustable and therefore variable. The technician could in such cases enter the set value via an interface, which is however time-consuming and cumbersome. Moreover, it is often not possible to read off the set value sufficiently accurately. With automatic determination of the spring pre-tension on the basis of the recorded angular position of the motor shaft, there is no cumbersome and inaccurate manual input.

One embodiment of the invention provides that the leaf is opened up to a reference opening position during the teach-in process, the angular position of the motor shaft is recorded at the reference opening position of the leaf and the functional relationship as a function of the angular position of the motor shaft being recorded at the reference opening position is selected from a set of predetermined reference functions. The predetermined reference functions can be stored in a memory device of an electronic control unit of the door or window closer. The calculation effort can be minimised by selecting a function from a set of predefined functions. In many cases, the type of assembly can be derived directly from the position of the motor shaft at an individual reference opening position of the leaf.

Preferably, it is provided that a predetermined angular position of the motor shaft corresponding to the reference opening position is assigned to each reference function and that this reference function is selected as the functional relationship whose predetermined angular position deviates least from the angular position of the motor shaft being recorded in the reference opening position. This takes into account that unavoidable minor deviations of the actual closing behaviour from the idealised closing behaviour always occur.

To improve the accuracy and robustness of the method, the leaf can be opened several times during the teach-in process up to the different reference opening positions, wherein the functional relationship is selected as a function of a plurality of angular positions of the motor shaft being recorded at reference opening positions. The selection can be made such that the total deviation is minimised.

The reference opening position preferably comprises an opening angle of the leaf of 90° and/or 45° being related to a closing position. It is relatively easy for a technician to move the leaf into such angular positions.

The reference functions can correspond to different designs and/or different assembly styles of the door or window closer. For a predetermined design and/or mounting method, the functional relationship between the motor shaft position and leaf position is generally known such that it can be predefined.

A further embodiment of the invention provides that the leaf is closed at least once by the energy accumulator in the teach-in process based on a reference opening position, wherein the angular position of the motor shaft is recorded at least in some sections during the closing process based on the time and the functional relationship is determined as a function of the time sequence of the angular position. From the time sequence of the angular position, the functional relationship between the motor shaft position and the leaf position can be derived relatively easily.

Specifically, the functional relationship can be selected as a function of the time sequence of the angular position of the motor shaft from a set of predetermined reference functions. The actual time sequence can therefore be compared to predetermined idealised time sequences in order to select the most suitable sequence.

It can be provided that each reference function is assigned a predetermined time sequence of the angular position of the motor shaft and that each reference function is selected as a functional relationship whose predetermined time sequence deviates least from the recorded time sequence. In general, the recorded time sequence will not correspond exactly to a predetermined theoretical sequence. By selecting the reference function that deviates least from the recorded time sequence, however, the actual conditions can be modelled sufficiently accurately.

The functional relationship can be calculated from the time sequence of the angular position of the leaf and the time sequence of the angular position of the motor shaft by eliminating the time variable. This enables the actual closing behaviour to be calculated relatively easily, wherein the use of pre-defined reference functions is not necessary.

According to a further embodiment of the invention, the angular position of the leaf is recorded during the closing process by means of at least one position sensor being arranged on the leaf, specifically by means of acceleration sensors and/or speed sensors and/or a gyroscope. This makes it relatively easy to establish the time sequence of the leaf position of the opening or closing process carried out during the teach-in phase.

In order to detect the angular position of the leaf, a mobile telephone with a position sensor can be fitted in a detachable manner to the leaf, wherein data recorded by the position sensor can be transmitted to a control device of the door or window closer after the leaf is closed. It is then not necessary to equip the leaf with a position sensor or to supply a special position sensor to be carried by the technician. A bag or clip, for example, can be attached to a flat side of the leaf to allow the detachable attachment of the mobile telephone to the leaf. In principle, it is also possible to provide a permanently mounted position sensor on the leaf.

A further embodiment of the invention provides that the closing speed of the leaf is at least temporarily kept constant by controlling the electric motor on the basis of the determined functional relationship, wherein the angular position of the motor shaft is recorded at least at two points during the closing movement at a constant closing speed and the recorded angular positions of the motor shaft are applied in a model equation which describes an unaccelerated movement of the leaf and wherein the pre-tension of a closing spring of the damping device is determined by solving the model equation. The functional relationship determined according to the invention between the angular position of the motor shaft and the angular position of the rotatable leaf can therefore be used advantageously to calculate the spring pre-tension.

The model equation can represent an energy balance which equates the energy loss of the electric motor and the difference in tension energy of the closing spring between the two points. Such a model equation is relatively simple to solve.

Alternatively, the model equation can represent a torque balance of the torques acting on the motor shaft. In this variant, a mean value can be formed where necessary using a variety of different equations.

A further embodiment of the invention provides that the determined functional relationship is incorporated into a model equation describing the movement of the leaf and that the mass inertia moment of the leaf is determined by solving the model equation. The movement of the leaf is preferably considered in an undamped initial region to do this. The determined mass inertia moment can be used for a variety of further control and monitoring tasks.

The angular position of the motor shaft can easily be recorded by means of an incremental encoder.

The invention also relates to a door or window closer which comprises an energy accumulator for supplying a closing force for closing a rotatable leaf of the door or sash of the window, a damping device counteracting the closing force with an electric motor being operable as a generator and an electronic control device for actuating the electric motor.

According to the invention, the electronic control device is designed for a commissioning method as described above.

The invention is described in the following by means of the attached drawings.

Figure 1:
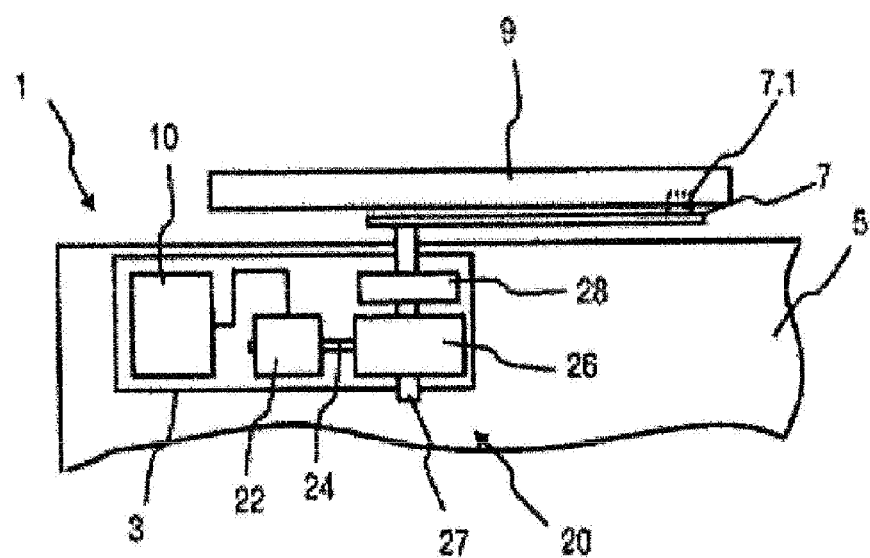
FIG. 1 is a schematic representation of an inventive door closer.

The door closer 1 shown in FIG. 1 features a housing 3 in which a mechanical energy accumulator in the form of a closing spring 28 and a braking device 20 is arranged. The closing spring 28 is loaded by manually opening the rotatable door leaf 5, with potential energy which recloses the released door leaf 5. The braking device 20 damps the movement of door leaf 5 and comprises an electric motor 22 operable as a generator, whose motor shaft 24 is rotatable by a movement of the door leaf 5 and on whose unembodied motor terminals a movement-dependent motor voltage is developed, which is applied to a braking circuit. The braking circuit has one or a plurality of switching elements via which the motor terminals can be short-circuited. An electronic control device 10 being provided for actuating the electric motor 22 carries out a pulse width modulation of the motor current and sets an effective braking force for damping the movement of the door leaf 5. The control device 10 preferably comprises a micro-controller. The electric motor 22 is preferably designed as a direct current motor being energised by a permanent magnet. The pulse width modulation can, for example, be carried out as indicated in DE 10 2015 200 284 B3.

In the exemplary embodiment shown in FIG. 1, the housing 3 is mounted securely in the upper left edge region of the door leaf 5. The motor shaft 24 of the electric motor 22 is coupled via a gear 26 with an output shaft 27, which is coupled to a sliding arm 7. The sliding arm 7 on its free end features a sliding block 7.1, which is guided into a sliding rail 9 being mounted firmly on the panel. When opening and closing the door leaf 5, the motor shaft 24 of the electric motor 22 is rotated by means of the gear 26. Instead of the arrangement of the sliding arm 7 and sliding rail 9, a lever arrangement can be provided, one end of which sits in a swivel bearing being mounted firmly on the panel. An incremental encoder, not shown, is provided on the electric motor 22 for the sensory recording of the angular position of the motor shaft 24.

The commissioning of the door closer 1 shown in FIG. 1 is described below. The commissioning method serves specifically to automatically determine certain mounting parameters and characteristic values. To ensure that the braking device 20 is able to control or regulate the damped closing movement of the door leaf 5 in a way, the mounting method must be known, for example. Since the movement of the door leaf 5 is to be controlled or regulated but generally only the angular position of the motor shaft 24 is known, for example by sensor recording using the incremental encoder, the dependence of the angular position of the door leaf 5 on the angular position of motor shaft 24 is also required. For certain control and monitoring tasks, for example limitation of the closing speed of the door leaf 5 to a non-hazardous limit value, the mass inertia moment of the door leaf 5 and the set pre-tension of closing spring 28 are also required.

Figure 2:
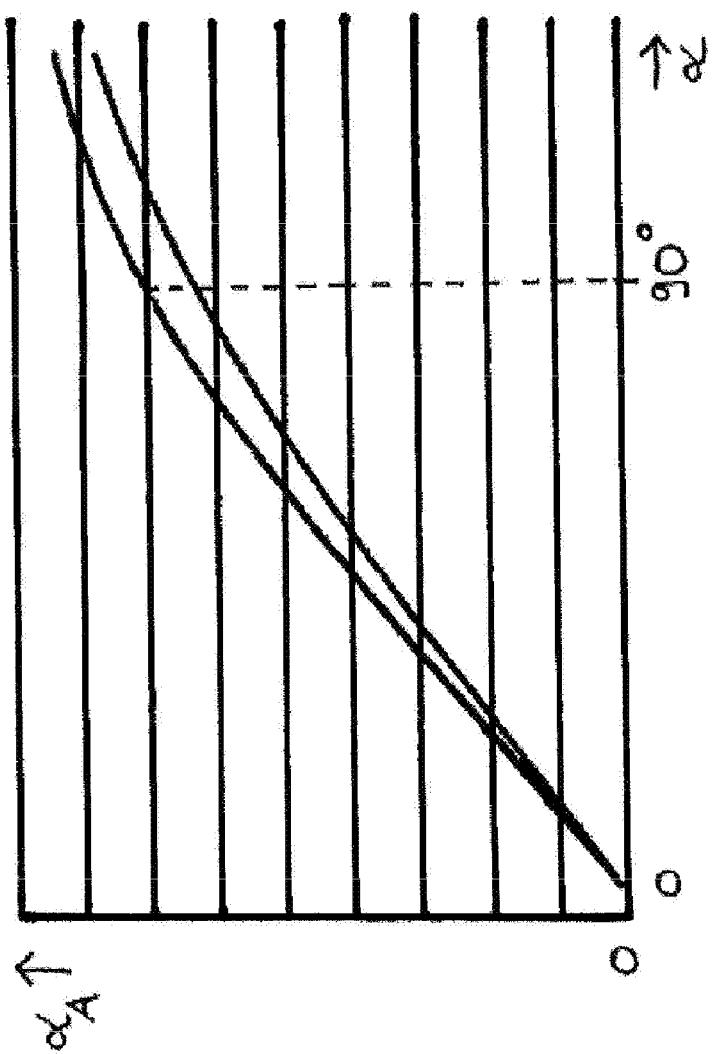
FIG. 2 is a diagram which represents the dependence of the angular position of an output shaft of the door closer shown in FIG. 1 on the angular position of the associated door leaf for two different mounting methods.

FIG. 2 shows two exemplary sequences of the angular position $_A$ of output shaft 27 as a function of the angular position of the door leaf 5, which correspond to different mounting parameters in the form of different distances from output shaft 27 from the door hinge. As can be seen, the angular position $_A$ of the output shaft 27 differs for the two centre distances at a predetermined reference opening angle of the door leaf 5, for example at an opening angle of 90°. Furthermore, the angular position $_A$ of the output shaft 27 is linked by means of the transmission of the gear 26 to the angular position $_M$ of the motor shaft 24. This means that the two assembly parameters can be differentiated between when the door leaf 5 is opened to the reference opening angle and a subsequent recording and reading of the angular position of motor shaft 24 by means of the incremental encoder are carried out.

To teach-in the actual mounting parameters, the technician opens the door leaf 5 to an opening angle of 90° when commissioning the door closer 1. After the opening angle is reached, the angular position $_M$ of motor shaft 24 is established by means of the incremental encoder. The recorded angular position $_M$ of motor shaft 24 is then compared with different reference functions which are recorded in a memory of the control device 10 (FIG. 1). This reference function, whose functional value for the angular position $_M$ (90°) of motor shaft 24 deviates at least from the recorded angular position of motor shaft 24 at the 90° point, is automatically taken as a basis for a subsequent actuation of the electric motor 22 to dampen the closing movement of the door leaf 5.

During commissioning, the technician can also open the door leaf 5 once to an opening angle of 90° and once to an opening angle of 45°, wherein the angular positions $_M$ of the motor shaft 24 are respectively recorded. Two values are then available for a comparison with the reference functions, thereby rendering the selection procedure more robust to an unavoidable variation in the mounting parameters. If necessary, further opening processes with different opening angles can be performed.

Figure 3:
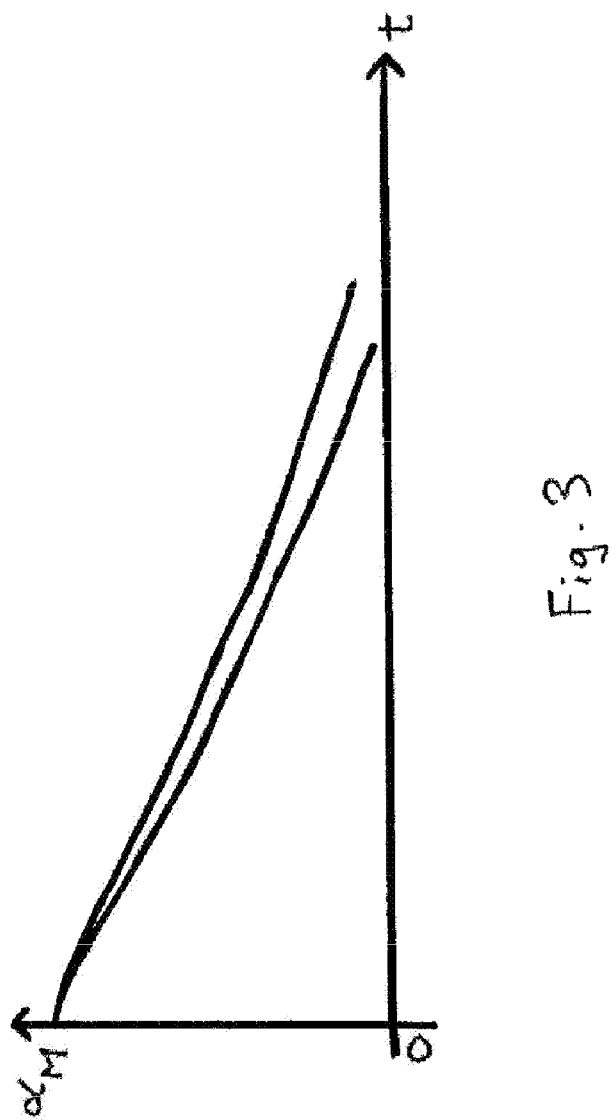
FIG. 3 is a diagram which represents the dependence of the angular position of a motor shaft of the door closer shown in FIG. 1 on the time for two different mounting methods.

In an alternative inventive commissioning method, the technician opens the door leaf 5 to an opening angle of 90° then releases it. The closing spring 28 closes the door leaf 5, wherein the closing process takes place initially undamped or with constant damping. The incremental encoder records the angular position $_M$ of the motor shaft 24 as a function of time t. Depending on the type of assembly, the mass inertia of the door leaf 5 and the pre-tension of the closing spring 28, there are different time sequences $_M(t)$ for the angular position of the motor shaft 24. Two exemplary sequences are shown in FIG. 3. The control device 10 searches for the most suitable time sequence in a data bank of stored sequences and derives from this the type of assembly and further parameters, as applicable, such as the closing direction.

Figure 4:
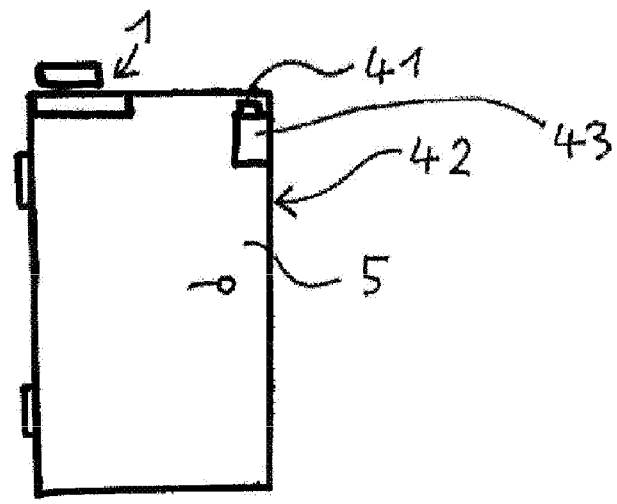
FIG. 4 shows a door with a door closer according to the invention and a pocket for the detachable attachment of a mobile telephone on the leaf of the door.
Figure 5:
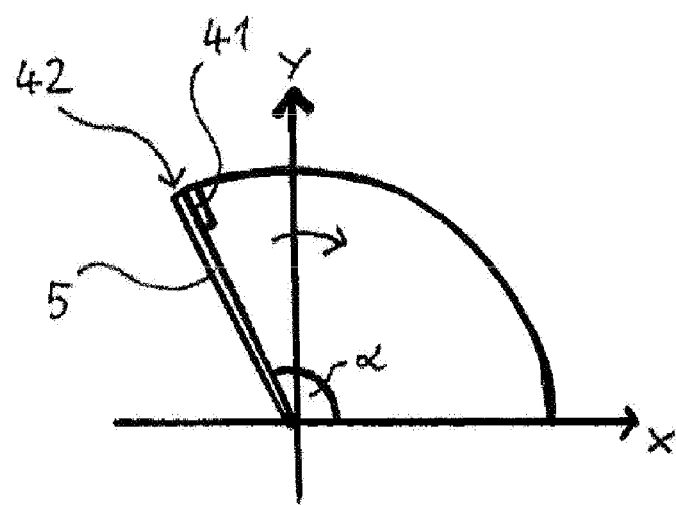
FIG. 5 is an aerial view of the leaf shown in FIG. 4.

With reference to FIGS. 4 and 5, a further possibility of determining the functional relationship between the angular position $_M$ of motor shaft 24 and the angular position of door leaf 5 is described. When commissioning the door closer 1, the technician takes a mobile telephone 41 with a gyroscope and places it in a pocket 43 being provided on the main closing edge 42 of the door leaf 5. The door leaf 5 is then opened to the maximum opening angle and released. The closing spring 28 closes the door leaf 5, wherein the gyroscope of the mobile telephone 41 records the time sequence of the local coordinates x and y of the main closing edge 42 (FIG. 5). During the closing process, the incremental encoder continuously records the angular position $_M$ of the motor shaft 24. After the closing process, the technician connects the mobile telephone 41 to the control device 10, for example by means of a cable or a radio connection. The control device 10 receives the time-dependent coordinates x and y from the mobile telephone 41 and calculates the functional relationship between the angular position $_M$ of the motor shaft 24 and the angular position of the door leaf 5 by eliminating the time. This can be achieved specifically by using the following formulae:

$$x(t) = b \cdot \cos((t))$$

$$y(t) = b \cdot \sin((t)),$$

wherein b is the width of the door leaf 5. In addition, the control device 10 can determine the maximum opening width, the width b of the door leaf 5 and/or the closing direction from the time-dependent coordinates x and y. In principle, the gyroscope could also be integrated into the door closer 1 such that no mobile telephone is required. The control device 10 can then simultaneously calculate the angular position $_M$ of the motor shaft 24 and the angular position of the door leave 5 when closing the door leaf, then determine the functional relationship $_M()$ directly from this. Instead of a gyroscope, other types of position sensors, such as acceleration sensors, magnetic field sensors or the like, may also be used.

Figure 6:
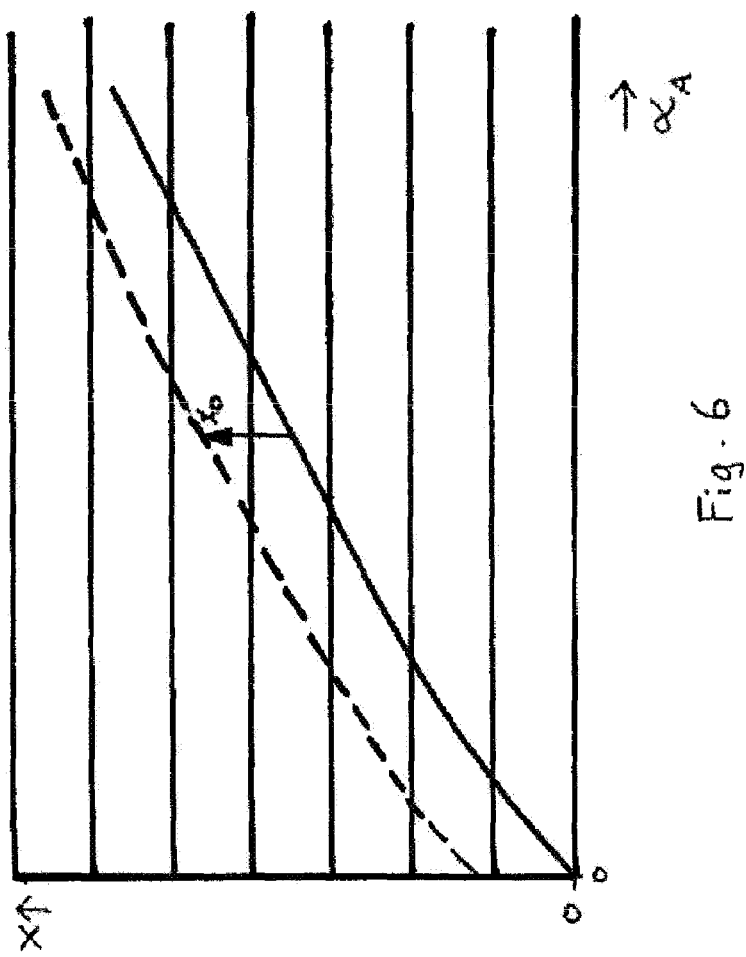
FIG. 6 is a diagram which illustrates the dependence of the spring deflection of a closing spring of a door closer according to the invention on the angular position of an output shaft of the door closer for two different spring pre-tensions.

In the commissioning method as per the invention, the pretension of closing spring 28 can also be achieved by the teach-in process. The dependence of the axial torque $m_A$ of the output shaft 27 on the deflection x of the closing spring 28 is determined by the design of the door closer 1 and is known to the control device 10. The additional torque $m_{FD}$ of the closing spring 28 being produced by the spring pretension is however initially unknown. The displacement of the spring characteristics curve as a function of the spring pretension is indicated in FIG. 6, which shows the spring deflection x as a function of the angular position $_A$ of the output shaft 27, drawn in a continuous line without initial deflection $x_0$ and in a dotted line with initial deflection $x_0$.

With a constant closing speed of the door leaf 5, the braking power of the braking device 20 corresponds to the reduction in the potential energy in the closing spring 28 aside from negligible losses. During the commissioning process, the technician opens the door leaf 5 and releases it again. The closing spring 28 closes the door leaf 5. After a short acceleration phase, the braking device 20 regulates the closing movement of the door leaf 5 to achieve a constant speed. This is possible specifically with the use of the aforedescribed taught-in functional relationship between the angular position $_M$ of the motor shaft 24 and the angular position of the door leaf 5. If the door leaf 5 moves between the two opening angles $\alpha_2$ and $\alpha_1$ at a constant speed, no energy is required for the acceleration of the door leaf 5 and the following equation applies:

$$\int_{\alpha_2}^{\alpha_1} u(t)i(t)dt = \frac{1}{2}c(x^2(\alpha_2) - x^2(\alpha_1))$$

Here c denotes the spring rate. The control device 10 ensures that the current i(t) and the voltage u(t) are recorded as a function of time t between the door angles $\alpha_2$ and $\alpha_1$. For the lost energy, the following without pre-tension is obtained using the deflection $x_{without}$:

$$\frac{1}{2}c[(x_{ohne}(\alpha_2) + x_0)^2 - (x_{ohne}(\alpha_1) + x_0)^2] =$$

$$\frac{1}{2}c[(x_{ohne}(\alpha_2))^2 - (x_{ohne}(\alpha_1))^2 + 2(x_{ohne}(\alpha_2) - x_{ohne}(\alpha_1))x_0]$$

The spring pretension $x_0$ can be calculated from this.

In an alternative method for the teach-in process for the pretension of the closing spring 28, the technician opens the door leaf 5 and releases it again, wherein the braking device 20 regulates the closing movement of the door leaf 5 to achieve a constant speed after a short acceleration phase. In the constant speed range, no external torque acts on the door leaf 5, such that the following equation applies:

$$K \cdot i(t) = \frac{\eta_G}{\ddot{u}_G}(m_F(t) + m_{F0})$$

Here K denotes the torque constant of the electric motor 22, i(t) denotes the motor current, $_G$ denotes the efficiency of the gear 26, $\ddot{u}_G$ denotes the transmission of the gear, $m_F$ denotes the spring torque and $m_{F0}$ denotes the spring pretension. The spring pretension $m_{F0}$ can easily be derived from the stated equation.

A plurality of equations is essentially available for calculating the spring pretension, as a new equation can be created for any change in the axial angle to calculate the spring pretension. Because of interferences and inaccuracies of the model, the control device 10 will generally calculate a different value for the spring pretension $m_{F0}$ for each equation. A reliable estimated value for the spring pretension $m_{F0}$ can specifically be the arithmetical mean value of all the obtained results. Before the closing position is reached, the braking device 20 damps the door leaf 5 to the desired final speed.

When commissioning a door closer 1 as per the invention, the mass inertia moment J of the door leaf 5 can also be carried out with the teach-in process. For this purpose, the technician opens the door leaf 5 and releases it again. The closing movement initially takes place undamped during a short initial acceleration phase. There is also no external torque. Therefore, the mass inertia moment J can be calculated using the following equation:

$$J \frac{1}{\ddot{u}_G \ddot{u}_B(\alpha)} \frac{d\omega(t)}{dt} + \frac{\eta_G}{\ddot{u}_G}(m_F(\alpha_A) + m_{F0}) = 0$$

Here $\ddot{u}_B$ denotes the transmission $_A()/$ and (t) denotes the angular velocity of the door leaf 5.

After the door closer 1 has been commissioned, the control device 10 can use the taught-in functional relationship $_M()$ between the angular position of the motor shaft 24 and the angular position of the door leaf 5, the taught-in mass inertia moment J and the taught-in spring pretension $m_{F0}$ of the closing spring 28 to control the closing movement of the door leaf 5 according to a predetermined trajectory.

The control device 10 can be specially designed to establish a theoretical trajectory which indicates the opening angle $\alpha$ of the door leaf 5 as a function of time t and to carry out the damping of the closing movement of the door leaf 5 being exerted by the electric motor 22 on the basis of the established theoretical trajectory. In this case, the regulation itself may take place according to generally known principles, for example by means of a position regulator or a speed regulator. This makes a situation-adapted closing behaviour of the door closer 1 possible, thus facilitating an extremely high comfort of use of the related door.

REFERENCE SIGN LIST

1 Door closer
3 Housing
5 Door leaf
7 Sliding arm
7.1 Sliding block
9 Sliding rail
10 Control device
20 Braking device
22 Electric motor
24 Motor shaft
26 Gear
27 Output shaft
28 Closing spring
41 Mobile telephone
42 Main closing edge
43 Pocket

The invention claimed is:

1. A method for the commissioning of a door or window closer (1), which comprises an energy accumulator (28) for supplying a closing force for closing a rotatable or movable door leaf (5) or window sash and a damping device (20) counteracting the closing force with an electric motor (22) being operable as a generator, wherein a motor shaft (24) of the electric motor (22) is coupled to the leaf (5) by means of at least one transmission element (7, 26, 27) and is therefore rotatable by a movement of the leaf (5), wherein
the leaf (5) is opened and/or closed at least once in a teach-in process,
the angular position of the motor shaft (24) is recorded during opening and/or closing,
a functional relationship between the angular position of the motor shaft (24) and an angular position of the rotatable leaf (5) is determined at least over an area of the opening width of the leaf (5) on the basis of the recorded angular position of the motor shaft (24) and
the functional relationship is automatically taken as a basis for a subsequent actuation of the electric motor (22) for the damping of the closing movement of the leaf (5).

2. The method according to claim 1 wherein
the mass inertia moment of the leaf (5) is also determined on the basis of the recorded angular position of the motor shaft (24) and is automatically taken as a basis for a subsequent actuation of the electric motor (22) to dampen the closing movement of the leaf (5).

3. The method according to claim 1 wherein
the energy accumulator (28) comprises a closing spring, wherein a pretensioning of the closing spring is also determined on the basis of the recorded angular position of the motor shaft (24) and is automatically taken as a basis for a subsequent actuation of the electric motor (22) for dampening the closing movement of the leaf (5).

4. The method according to claim 1 wherein
the leaf (5) is opened up to a reference opening position during the teach-in process, the angular position of the motor shaft (24) is recorded at the reference opening position of the leaf (5) and the functional relationship as a function of the angular position of the motor shaft (24) being recorded at the reference opening position is selected from a set of predetermined reference functions.

5. The method according to claim 4 wherein
a predetermined angular position of the motor shaft (24) corresponding to the reference opening position is assigned to each reference function and that this reference function is selected as the functional relationship whose predetermined angular position deviates least from the angular position of motor shaft (24) being recorded in the reference opening position.

6. The method according to claim 4 wherein
the leaf (5) is opened several times during the teach-in process up to the different reference opening positions and the functional relationship is selected as a function of a plurality of angular positions of the motor shaft (24) being recorded at reference opening positions.

7. The method according to claim 4 wherein
the reference opening position comprises an opening angle of the leaf (5) of 90° and/or 45° being related to a closing position.

8. The method according to claim 4 wherein
the reference functions correspond to different designs and/or different methods of mounting the door or window closer (1).

9. The method according to claim 1 wherein
the leaf (5) is closed at least once by the energy accumulator (28) in the teach-in process based on a reference opening position, wherein the angular position of the motor shaft (24) is recorded at least in some sections during the closing process based on the time and the functional relationship is determined as a function of the time sequence of the angular position.

10. The method according to claim 9 wherein
the functional relationship is selected as a function of the time sequence of the angular position of the motor shaft (24) from the set of predetermined reference functions.

11. The method according to claim 10 wherein
each reference function is assigned a predetermined time sequence of the angular position of the motor shaft (24) and that each reference function is selected as a functional relationship whose predetermined time sequence deviates least from the recorded time sequence.

12. The method according to claim 9 wherein
the functional relationship is calculated from the time sequence of the angular position of the leaf (5) and the time sequence of the angular position of the motor shaft (24) by eliminating the time variable.

13. The method according to claim 9 wherein
the angular position of the leaf (5) is recorded during the closing process by means of at least one position sensor being arranged on the leaf, specifically by means of acceleration sensors and/or speed sensors and/or a gyroscope.

14. The method according to claim 13 wherein
a mobile telephone (41) with a position sensor is fitted in a detachable manner to the leaf (5) to detect the angular position of the leaf (5) and data recorded by the position sensor is transmitted to a control device (10) of the door or window closer (1) after the leaf (5) is closed.

15. The method according to claim 9 wherein
the closing speed of the leaf (5) is at least temporarily kept constant by controlling the electric motor (22) on the basis of the determined functional relationship, wherein the angular position of the motor shaft (24) is recorded at least at two points during the closing movement at a constant speed and the recorded angular positions of the motor shaft (24) are applied in a model equation which describes an unaccelerated movement of the leaf (5) and wherein the pre-tension of the closing spring (28) of the damping device (20) is determined by solving the model equation.

16. The method according to claim 15 wherein the model equation represents an energy balance which equates the energy loss of the electric motor (22) and the difference in tension energy of the closing spring (28) between the two points.

17. The method according to claim 15 wherein the model equation can represent a torque balance of the torques acting on the motor shaft (24).

18. The method according to claim 1 wherein the determined functional relationship is incorporated into a model equation describing the movement of the leaf (5) and the mass inertia moment of the leaf (5) is determined by solving the model equation.

19. The method according to claim 1 wherein the angular position of the motor shaft (24) is recorded by means of an incremental encoder.

20. A door or window closer (1) which comprises an energy accumulator (28) for supplying a closing force for closing a rotatable leaf (5) of the door or sash of the window, a damping device (20) counteracting the closing force with an electric motor (22) being operable as a generator and an electronic control device (10) for actuating the electric motor (22), wherein
the electronic control device (10) is designed for a commissioning method according to claim 1.

* * * * *